(12) United States Patent
Kim

(10) Patent No.: US 11,397,338 B2
(45) Date of Patent: Jul. 26, 2022

(54) EYEWEAR ACCESSORY MOUNT

(71) Applicant: Chong Kim, Holmdel, NJ (US)

(72) Inventor: Chong Kim, Holmdel, NJ (US)

(*) Notice: Subject to any disclaimer, the term of this patent is extended or adjusted under 35 U.S.C. 154(b) by 410 days.

(21) Appl. No.: 16/421,882

(22) Filed: May 24, 2019

(65) Prior Publication Data

US 2020/0355943 A1 Nov. 12, 2020

Related U.S. Application Data

(60) Provisional application No. 62/844,268, filed on May 7, 2019.

(51) Int. Cl.
*G02C 11/00* (2006.01)

(52) U.S. Cl.
CPC .................................. *G02C 11/00* (2013.01)

(58) Field of Classification Search
CPC ................................................ G02C 11/00–02
See application file for complete search history.

(56) References Cited

U.S. PATENT DOCUMENTS

| | | | | | |
|---|---|---|---|---|---|
| 2,766,500 | A | * | 10/1956 | Chanko | G02C 3/006 24/332 |
| 4,139,281 | A | * | 2/1979 | Luttner | G02C 11/00 351/111 |
| 4,476,777 | A | * | 10/1984 | Dutchburn | A47J 37/041 99/421 H |
| 4,917,479 | A | * | 4/1990 | Bidgood | G02C 5/143 351/118 |
| 4,968,128 | A | * | 11/1990 | Mendola | G02C 11/02 351/51 |
| 5,096,284 | A | * | 3/1992 | NakaMats | G02C 3/003 351/118 |
| 5,176,262 | A | * | 1/1993 | Zoueki | A47F 7/021 211/85.1 |

(Continued)

FOREIGN PATENT DOCUMENTS

| | | | | | |
|---|---|---|---|---|---|
| GB | 2443325 | A | * | 4/2008 | ............ G02C 11/00 |
| GB | 2472120 | A | | 1/2011 | |
| JP | 2004184819 | A | * | 7/2004 | ............ G02C 5/143 |

OTHER PUBLICATIONS

Blaine R. Copenheaver, International Search Report and Written Opinion issued in PCT Application No. PCT/US2020/034582 dated Aug. 7, 2020.

*Primary Examiner* — Christopher Stanford
(74) *Attorney, Agent, or Firm* — Kaplan Breyer Schwarz, LLP

(57) ABSTRACT

A mount that reversibly couples with an eyeglass-frame temple to enable adjustment of the balance of eyeglasses is presented. The mount includes a rigid outer shell whose interior area is filled with a resilient material. The rigid shell provides strength, while the deformability of the resilient material enables the mount to securely conform to the shape of any of a wide range of temple designs virtually anywhere along its length. Additional counterweights and/or other accessories can be attached to the mount, as desired. The shell includes a clamp that comprises a u-shaped frame and a hasp that is joined with the frame at a rotary joint. The hasp is rotated about the rotary joint to enable its attachment to, and release from, the frame. The free end of the hasp connects with the frame via a clasp that is configured to mitigate the inadvertent decoupling of the hasp and frame.

21 Claims, 6 Drawing Sheets

(56) References Cited

U.S. PATENT DOCUMENTS

| | | | | |
|---|---|---|---|---|
| 5,471,679 A * | 12/1995 | Paoluccio | A41D 13/1184 | |
| | | | 2/9 | |
| 6,210,003 B1 * | 4/2001 | Chan | G02C 3/04 | |
| | | | 24/3.3 | |
| 6,564,432 B1 * | 5/2003 | Kushner | A44B 99/00 | |
| | | | 24/163 K | |
| 6,606,192 B2 * | 8/2003 | Haran | G02B 7/002 | |
| | | | 359/399 | |
| 6,938,304 B2 * | 9/2005 | Chen | A45F 5/00 | |
| | | | 24/3.12 | |
| 7,331,554 B2 * | 2/2008 | Cheng | A45C 11/04 | |
| | | | 24/3.12 | |
| 7,556,232 B1 * | 7/2009 | Begg | A47F 7/0243 | |
| | | | 24/3.12 | |
| 10,120,646 B2 | 11/2018 | Jannard et al. | | |
| 10,423,007 B2 * | 9/2019 | Sandt | G02C 3/003 | |
| 10,897,072 B2 * | 1/2021 | Iannuzzi | H01Q 1/18 | |
| 2006/0055869 A1 | 3/2006 | Dietz | | |
| 2007/0046889 A1 * | 3/2007 | Miller | G02C 3/003 | |
| | | | 351/62 | |
| 2007/0236650 A1 | 10/2007 | Jain | | |
| 2012/0026454 A1 | 2/2012 | Wu | | |
| 2015/0216710 A1 | 8/2015 | Grantham et al. | | |
| 2017/0068115 A1 | 3/2017 | Aquino et al. | | |
| 2017/0285367 A1 * | 10/2017 | Sandt | G02C 3/003 | |
| 2018/0259789 A1 | 9/2018 | Bruender | | |

* cited by examiner

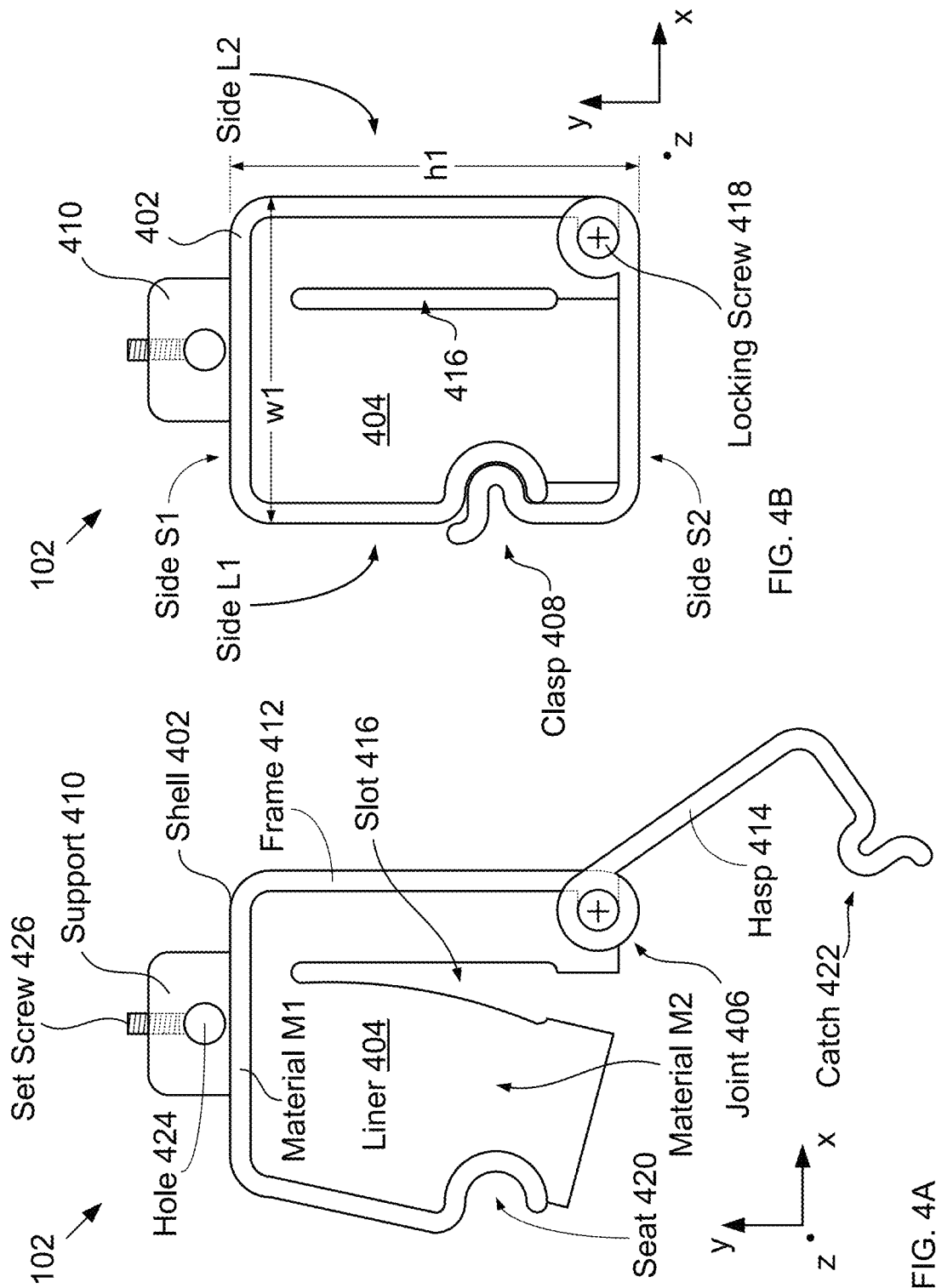

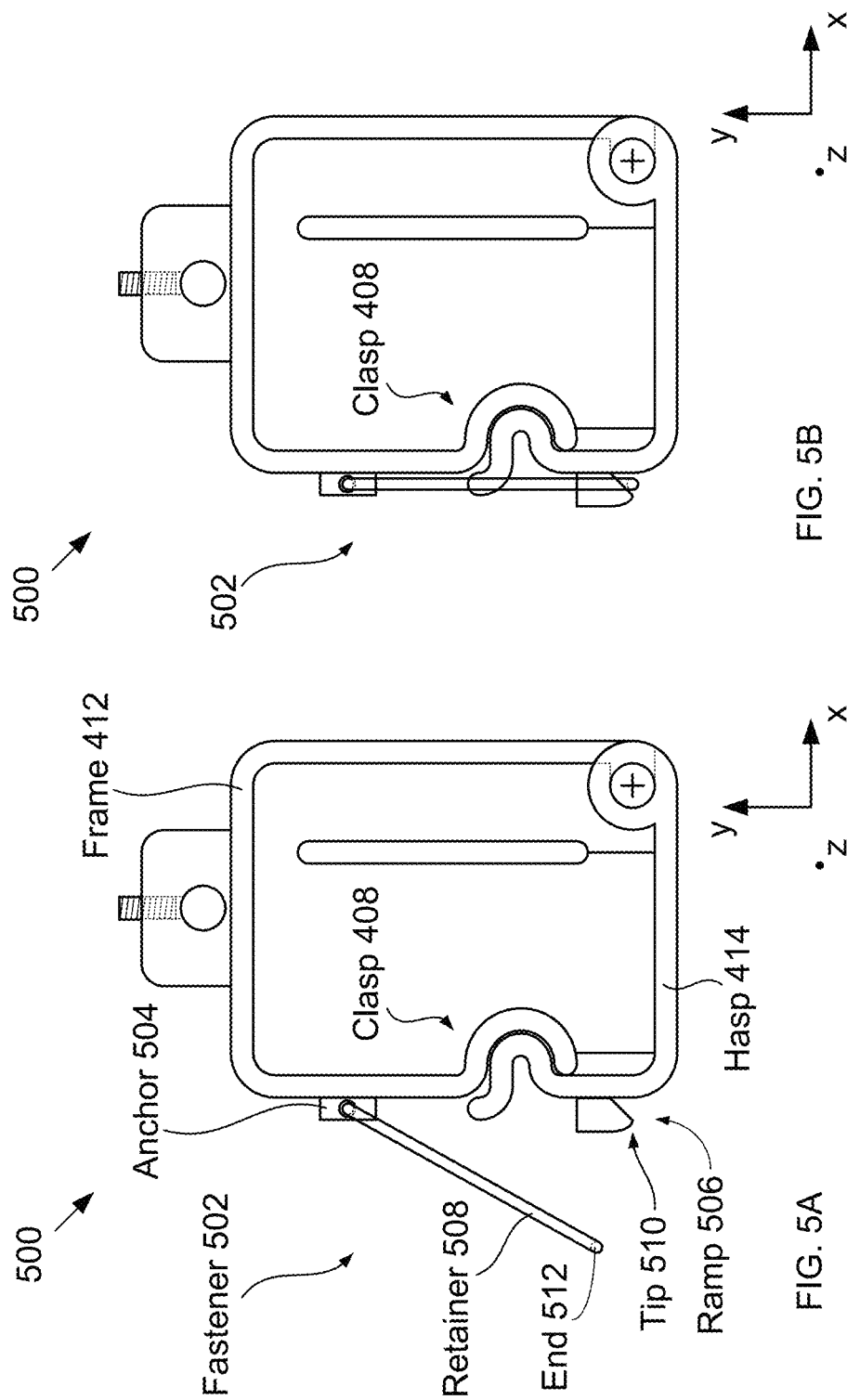

EYEWEAR ACCESSORY MOUNT

CROSS REFERENCE TO RELATED APPLICATIONS

This application claims the benefit of U.S. Provisional Application Ser. No. 62/844,268, filed May 7, 2019, entitled "Accessory Mount for Eyeglass Frames", which is incorporated herein by reference. If there are any contradictions or inconsistencies in language between this application and one or more of the cases that have been incorporated by reference that might affect the interpretation of the claims in this case, the claims in this case should be interpreted to be consistent with the language in this case.

TECHNICAL FIELD

The present disclosure relates to eyewear in general, and, more particularly, to mounts for controlling weight distribution of the eyewear and/or attaching one or more accessories.

BACKGROUND

Conventional eyeglasses include a frame having two rims connected by a bridge, as well as nose arms and pads that rest on the nose to support the front part of the eyeglasses. Lenses, one for each eye, fit into the rims on either side of a nose piece. Connected to the lateral ends of the frame are two temple bars (i.e., temples), one for each side. Attached to or extending from the temples are temple tips that sit and/or loop around the ear to help secure the eyeglasses to the head of the wearer.

Unfortunately, the wearing of eyeglasses can lead to considerable discomfort for a user. Negative physical effects that arise from the wearing of eyewear include headaches, facial pain, nausea, dizziness, and reduced work productivity. Many of these physical effects derive from pressure on the mid-portion of the face due to pressure associated with the weight of eyewear. Various modifications made to the frame to enhance its fit to the wearer's face can exacerbate these problems and, in some cases, add additional problems (e.g., chafing due to eyeglass motion on the face, etc.). Direct and indirect costs of these problems are not negligible, individually, or for society as a whole. From a business standpoint, the discomfiture of wearing glasses may discourage consumers from buying glasses.

Furthermore, slippage of eyewear during use is common and can significantly impact the user's productivity. For example, when playing golf while wearing eyeglasses or sunglasses, bending the user's head forward to hit the ball can cause the eyeglasses to slip forward, which may distort one's vision and/or break the concentration of the player to the detriment of accuracy of the shot. Bending to pick up balls may cause the eyewear to fall off the user's head, which may result in its physical damage or loss (e.g., if over a lake, etc.). Still further, there are many situations that require strict sterility (e.g., in an operating room or laboratory). In such cases, physical readjustment of eyeglasses on a user's face could result in contamination of the field.

Eyewear having improved comfort and that mitigates the need for adjusting the position of eyewear on the user's face would be an advance in the state-of-the-art.

SUMMARY

The present disclosure is directed to a system for improving the balance of eyeglasses, or other eyewear, to improve the comfort of the user. Embodiments in accordance with the present disclosure include a mount that is reversibly attachable to a wide range of eyeglass-frame types, where the position of the mount on the frame is adjustable, thereby enabling the moments of inertia about the balance point of the eyewear to be balanced. In some embodiments, a mount in accordance with the present disclosure enables the reversible attachment of an accessory to the eyewear, such as a counterweight to increase the mass of the mount, an illuminator, a laser pointer, a sensor, audio equipment, and the like.

Like prior-art eyeglass-frame mounts, embodiments in accordance with the present disclosure include a housing that can be attached to a temple of an eyeglass frame. In sharp contrast to prior-art mounts, however, mounts in accordance with the present disclosure comprise an outer housing that is rigid, completely surrounds the temple, and includes a resilient inner liner that can conform to a wide range of temple shapes. The rigidity of the outer housing provides strength and high clamping force, while the resiliency and/or compressibility of the liner material enables the liner to deform as necessary to mate with the frame without slipping. Furthermore, since the outer housing and inner liner completely surround the temple, more weight, or heavier accessories, can be securely attached to the frame than can be accommodated using prior art eyeglass-frame mounts.

An illustrative embodiment is a mount that includes an outer housing (i.e., shell) having an interior area that is at least partially filled with a resilient material, where the housing completely surrounds the temple of an eyeglass frame and is secured by a clasp configured to mitigate its accidental release. The inner liner is configured to conform to a wide range of temple shapes and mitigate relative motion of the mount and the temple once the mount is secured to the temple by the closure of the clasp. The conformability of the inner liner also enables the mount to be secured virtually anywhere along the length of the temple, thereby enabling a more comfortable fit for the eyewear, as well as a highly secure positioning of an accessory, such as additional counterweight, an illuminator, etc., in its proper location.

In some embodiments, a mount is configured to accept an accessory comprising a counterweight to increase the mass of the mount, thereby facilitating the establishment of a proper weight distribution of a pair of eyeglasses.

In some embodiments, a mount is a weight stabilizer suitable for demountably attaching to a temple of an eyeglass frame to change the moment-of-inertia and weight distribution of the eyeglasses about a point at which they rest on a user's ears. In some such embodiments, the mount comprises a core, an external shell, and a locking mechanism for fixing the position of the shell relative to the core, where the shell includes a high-density material that affords it suitable weight.

In some embodiments, a mount is configured to secure another accessory, such as a light, laser, magnifier, etc., to a temple.

In some embodiments, two mounts are used cooperatively to achieve proper balance for eyeglasses, where each mount is secured to a different temple. In some embodiments, an accessory is attached to a first mount that is secured to one temple of an eyeglass frame and a counterweight is attached to a second mount that is secured to the other temple of the eyeglass frame. In some embodiments, a first mount for holding an accessory is attached to a first location on a temple and a second mount is attached to the same temple to act as a counterbalance for the first mount and the accessory.

An embodiment in accordance with the present disclosure is a first mount that is reversibly attachable to a first temple of an eyeglass frame, the first mount comprising: (i) a first shell comprising a first material that is substantially rigid, the first shell defining a first interior region; and (ii) a first liner comprising a second material that is resilient, wherein the first liner is located within the first interior region; wherein the first mount has (1) a first open state in which the first temple can be inserted into the first interior region and (2) a first closed state in which the first shell surrounds the first interior region; and wherein the first shell and the first liner exert a compressive force on the first temple when the first mount is in its first closed state, and wherein the compressive force inhibits relative motion between the first mount and the first temple.

Another embodiment in accordance with the present disclosure is an apparatus comprising a mount that is reversibly attachable to a temple of an eyeglass frame, the mount comprising: (i) a frame having a u-shape, the frame comprising a first material that is rigid, and the frame having a first end that includes a seat and a second end that includes a rotary joint; (ii) a hasp comprising a second material that is rigid, the hasp being attached with the frame at the rotary joint such that the hasp is rotatable about the second end, wherein the hasp includes a catch that is distal to the second end, and wherein the frame and the hasp collectively define a shell that has an interior region; (iii) a liner that comprises a third material that is resilient, the liner being located within the interior region; and (iv) a clasp that includes the seat and the catch, wherein the clasp defines a first fastener operative for latching to hold the shell in its closed state, and wherein the shell surrounds the interior region when the clasp is latched; wherein the shell induces a compressive stress on the temple via the liner when the shell is in the closed state, and wherein the compressive stress inhibits relative motion between the mount and the temple.

BRIEF DESCRIPTION OF THE DRAWINGS

FIGS. 4A-B depict schematic drawings of an illustrative embodiment of an accessory mount in accordance with the present disclosure in its open and closed configurations, respectively.

FIGS. 5A-B depict schematic drawings of an alternative mount in accordance with the present disclosure.

DETAILED DESCRIPTION

Figure 1:
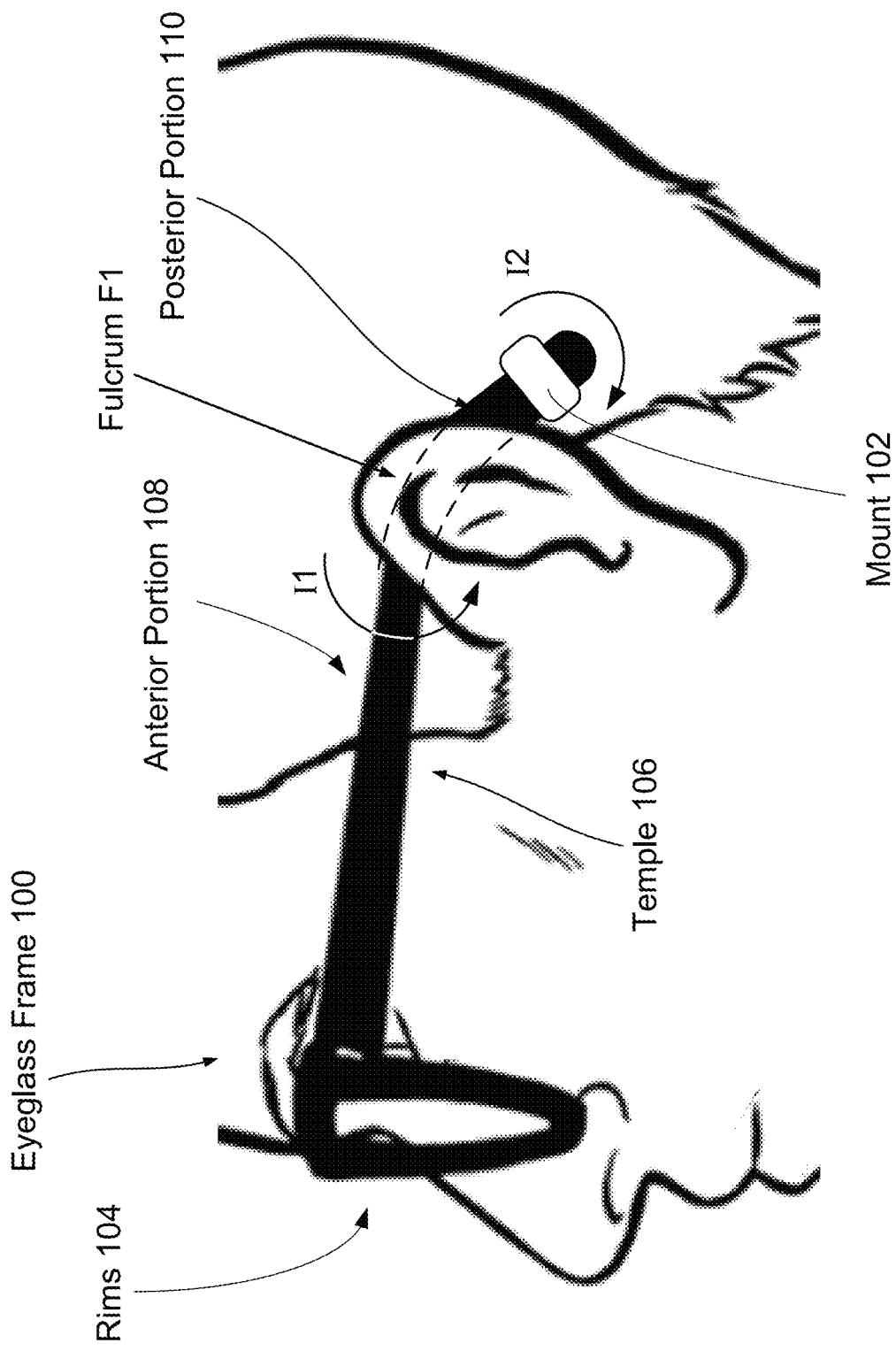
FIG. 1 depicts a schematic drawing of a conventional eyeglass frame to which a mount in accordance with the present disclosure is secured.

FIG. 1 depicts a schematic drawing of a conventional eyeglass frame to which a mount in accordance with the present disclosure is secured.

Eyeglass frame 100 (hereinafter referred to as frame 100) includes two rims 104, and two temples 106. Each of rims 104 contains a lens (not shown) and are connected via nose arms and pads (not shown) that rest on the nose to support the front part of the eyeglasses.

Each of temples 106 is a lateral support member attached to a rim 104 and extending from that rim to a temple tips that sit and/or loop around the ear to help secure the eyeglasses to the head of the wearer. Each temple 106 has an anterior portion 108, which sits in front of the user's ear, and a posterior portion 110, which sits behind the user's ear. Fulcrum F1 of frame 102 is defined by the point at which temples 106 rest on the user's ears.

Unfortunately, the structure of a conventional eyeglass frame is typically unbalanced, with more mass being located forward of the user's ear than behind it, due to the weight of the lenses and the fact that anterior portion 108 is normally much longer than posterior portion 110. This gives rise to unequal moments of inertia (MOI) about fulcrum F1 such that MOI I1 is significantly greater than MOI I2, resulting in instability and undesirable movement of the eyeglasses.

It is an aspect of the present disclosure, however, that the center of mass and, therefore, the balance point of eyeglasses can be aligned with fulcrum F1 by properly locating mounts 102 on posterior portions 110, thereby mitigating the negative effects of weight imbalance and substantially equalizing MOI I1 and I2.

Mount 100 is a reversibly attachable element that is configured such that it can be securely attached with temple 104 at virtually any desired position. Mount 100 is described in more detail below and with respect to FIGS. 4-6.

Mounts for attaching to the temples of an eyeglass frame are known in the prior art. As discussed below and with respect to FIGS. 2A-B and 3, however, prior-art mounts have several disadvantages.

First, typical conventional mounts are configured to attach to a limited number (often, one) of temple designs. As a result, a user must have a different mount for each different pair of eyeglasses (e.g., reading glasses, sunglasses, distance glasses, etc.). In addition, when the user acquires new glasses, a new mount must often be acquired as well.

Second, prior-art mounts that are configured to fit a range of eyeglass frames do not have sufficient structural rigidity, sturdiness, and/or stability to support the attachment of any significant mass.

Third, prior-art mounts typically have a fixed anchoring position along the length of the temple. The desirable anchoring position can vary from user to user, however, due to differences in user physiology, and the like. In addition, when used to attach an external accessory, the preferred anchoring position of a mount can be dictated by the utility/purpose of the accessory to be attached to the eyeglass frame. Unfortunately, for a rigidly fixed prior-art mount, varying the anchoring position is not feasible.

Figure 2A:
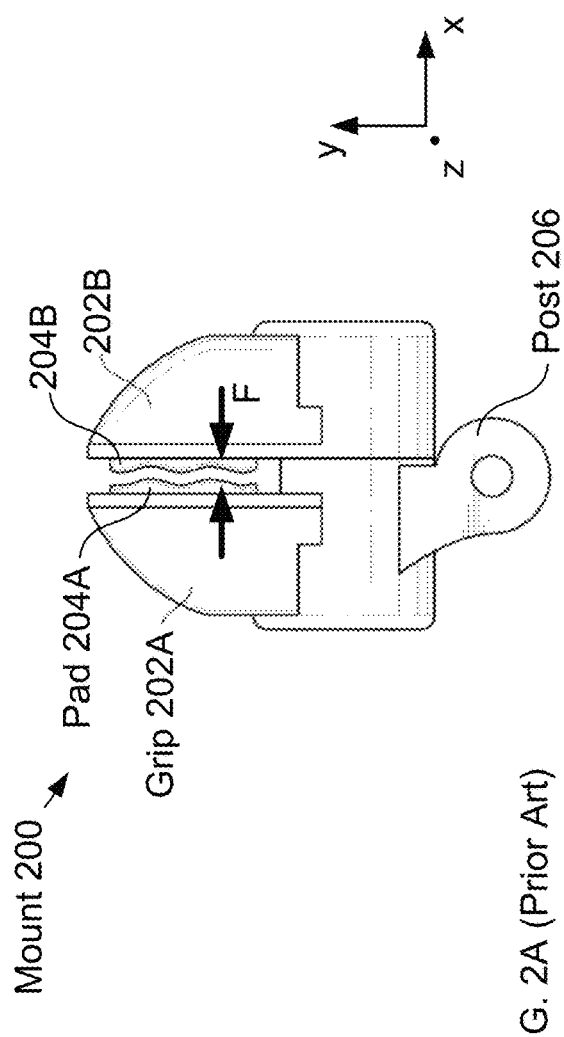
FIGS. 2A-B depict schematic drawings of a first accessory mount in accordance with the prior art, which is shown disengaged and engaged with an eyeglass-frame temple, respectively.
Figure 2B:
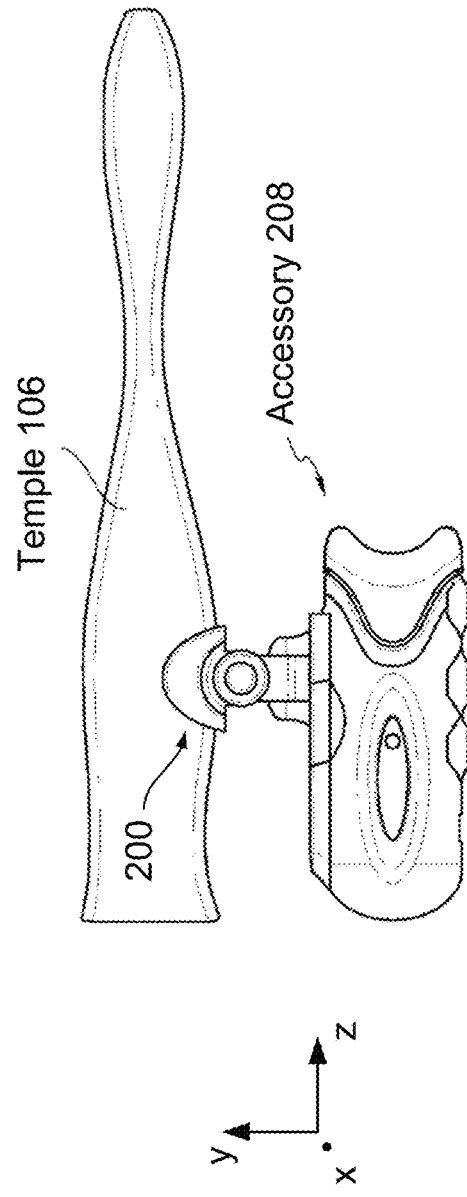

FIGS. 2A-B depict schematic drawings of a first accessory mount in accordance with the prior art, which is shown disengaged and engaged with an eyeglass-frame temple, respectively. Mount 200 includes grips 202A and 202B, pads 204A and 204B, and post 206. Mount 200 is analogous to accessory mounts disclosed in U.S. Pat. No. 10,120,646, issued Nov. 6, 2018, which is incorporated herein by reference.

Grips 202A and 202B (referred to, collectively, as grips 202) are rigid clamshell structures that are operatively coupled with a spring-loaded release (not shown). When the release is opened, grips 202 separate to enable them to be positioned on either side of temple 106. Upon closure of the release, the grips are moved toward one another to secure mount 200 to the temple.

Pads 204A and 204B (referred to, collectively, as pads 204) are attached to the inner surfaces of grips 202A and 202B, respectively. Pads 204 are made of an elastomeric material, such as foam, plastic, etc., which enables them to conform to the shape of temple 106 upon closure of grips 202. The use of an elastomeric material for pads 204 provides a measure of compliance that enables mount 200 to attach to a plurality of eyeglass frames by accommodating some variation in the shape and thickness of the temple to which it is secured.

Post 206 is an attachment point to which accessory 208 can be secured, as shown in FIG. 2B.

Unfortunately, because mount 200 attaches to a temple only by gripping the temple from its opposing sides (i.e., by squeezing the temple between pads 204), the security of its attachment is reduced. This can be particularly problematic for the attachment of heavier accessories.

It should be noted that mount 200 does not surround temple 106. As a result, the force that keeps mount 200 in place arises purely from the friction induced between pads 204 and temple 106, which is based on the lateral clamping force, F, applied to grips 202. As a result, the mount can slip free from the temple when, for example, the weight associated with accessory 208 exceeds the friction force keeping the mount in place on temple 106, which puts a restriction on the weight of accessory 208. Furthermore, undesirable slippage between mount 200 and temple 106 can increase when, for example, temple 106 is tapered (e.g., thicker in the center or near one edge, etc.) or the head of the user is moved about during performance of a task, generating additional forces on the mount. It is clear, therefore, that mount 200 fails to provide secure attachment of accessory 208.

Figure 3:
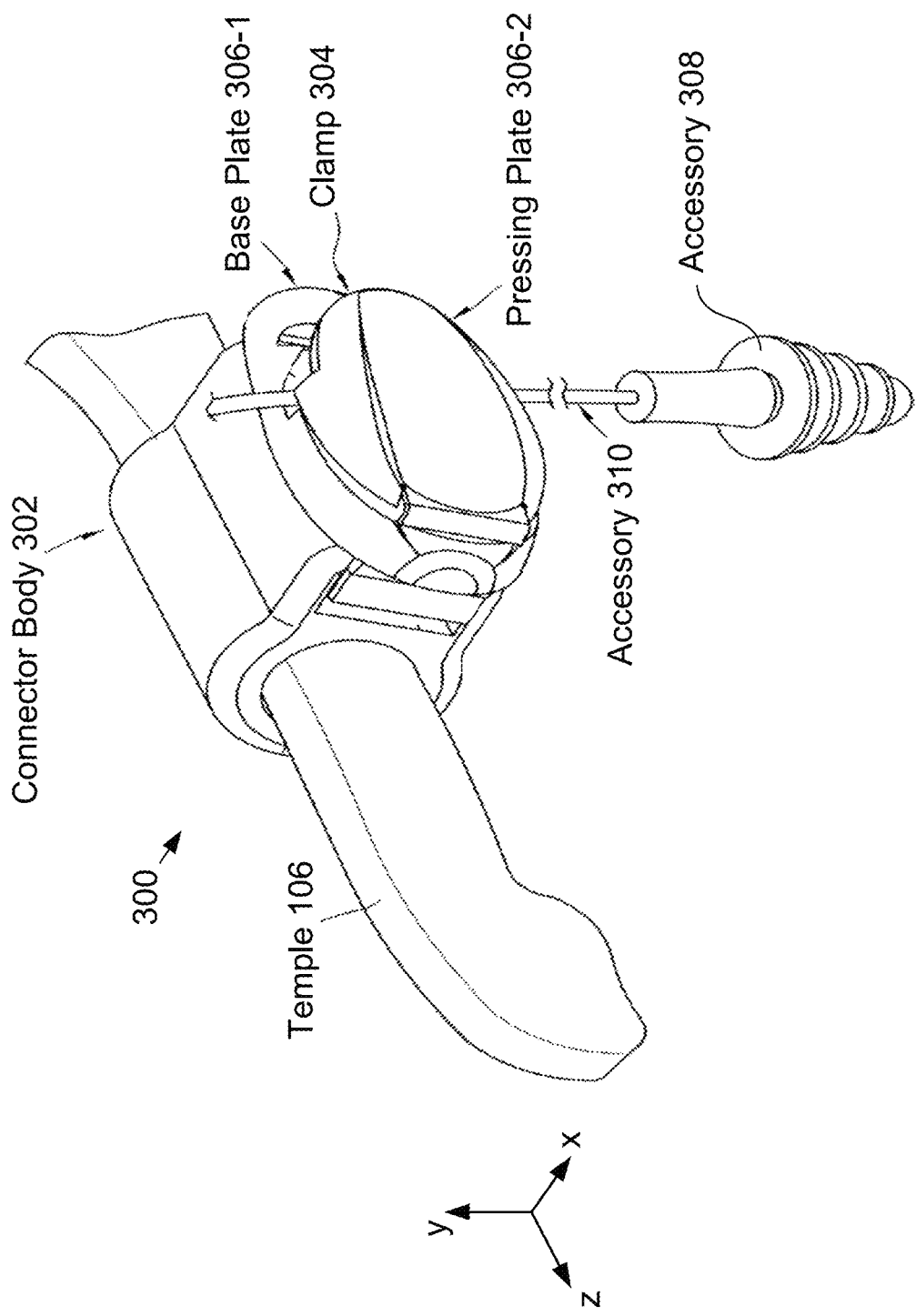
FIG. 3 depicts a schematic drawing of a perspective view of a second accessory mount in accordance with the prior art.

FIG. 3 depicts a schematic drawing of a perspective view of a second accessory mount in accordance with the prior art. Mount 300 includes connector body 302 and clamp 304. Mount 300 is analogous to accessory mounts disclosed in U.S. Patent Publication No. 2012/0026454, published Feb. 2, 2012, which is incorporated herein by reference.

Connector body 302 is a flexible sleeve that is configured to slip over temple 106 such that it partially surrounds and hangs from the temple. Connector body 302 is made entirely of a flexible material, such as silica gel, which enables the connector body to conform to and couple with different eyeglass-frame-temple shapes.

Clamp 304 includes base plate 306-1 and pressing plate 306-2, which are designed to trap tether 308 between them when the clamp is closed.

Accessory 308 is one of two earplugs that are connected together via tether 310. By trapping tether 308 in clamp 304, the earplugs can be kept together with a pair of safety glasses (of which, temple 106 is part).

Since connector body 302 completely surrounds temple 106, mount 300 is securely attached to the temple. Unfortunately, because connector body 302 is made of a flexible material, whatever is attached to temple 106 via mount 300 is subject to motion during use. In many applications, such motion is not an issue; however, in some cases the position and orientation of accessory 308 is important. For such cases, therefore, mount 300 is inadequate.

It should be further noted that the flexible material of connector body 302 is not surrounded by any rigid structural material. As a result, the connector body 302 will deform when accessory 308 is added, as well as enable additional motion of accessory 308 relative to the user's head as it moves. Furthermore, flexible material, such as silica gel, is typically prone to failure under a large tensile load.

FIGS. 4A-B depict schematic drawings of an illustrative embodiment of a mount in accordance with the present disclosure in open and closed configurations, respectively. Mount 102 includes shell 402, liner 404, joint 406, clasp 408, and support 410.

Shell 402 is a frame having a cross-sectional area large enough to accommodate most eyeglass-frame temples. Shell 402 comprises material M1, which is a substantially rigid material that provides shell 402 high mechanical strength. In the depicted example, material M1 is cellulose acetate butyrate; however, other materials can be used for material M1 without departing from the scope of the present disclosure. Materials suitable for use in shell 402 include, without limitation, metals (e.g., steel, aluminum, copper, brass, wrought iron, nickel, zinc, etc.), plastics (e.g., nylon, acrylic, Acrylic or Polymethyl Methacrylate (PMMA), Polycarbonate (PC), Polyethylene (PE), Polypropylene (PP), Polyethylene Terephthalate (PETE or PET), Polyvinyl Chloride (PVC), Acrylonitrile-Butadiene-Styrene (ABS), etc.), wood, composite materials, and the like. In some embodiments, shell 402 includes a combination of more than one material.

In the depicted example, shell 402 has a width, w1, of approximately 6 mm, a height, h1, of approximately 12 mm, and a depth, d1, in the z-direction (as shown in FIG. 5A) of approximately 12 mm. Preferably, d1 is within a range that provides both secure attachment to an eyeglass-frame temple and comfort for the user. It should be noted that the depth of mount 102 can be larger if it is to be secured toward the front of the temple (i.e., between the user's ear and the front of the eyeglasses); however, in applications wherein mount 102 is to be secured to a temple behind the ear, depth, d1, must be less than 6 mm and, preferably, less than about 2 mm.

Frame 402 includes frame 412 and hasp 414, which are connected at joint 406 such that hasp 414 can be opened and closed relative to frame 412 to enable an eyeglass temple to be inserted into mount 102.

Liner 404 is an inner liner of material M2. Material M2 is a resilient material that is formed to substantially fill the interior of frame 412.

In the depicted example, liner 404 comprises silica gel; however, one or more different materials, such as rubber, foam (e.g., latex rubber foam, polyurethane foam, memory foam, gel foam, convoluted foam, Evlon, Supreem, Rebond, closed cell foam, dry fast foam, etc.), silicone, fabric, styrofoam, and the like, can be used in liner 404 without departing from the scope of the present disclosure. Preferably, the material of liner 404 is selected such that the liner mitigates motion of the element to which mount 102 is attached once shell 402 is closed.

As will be apparent to one skilled in the art, there are numerous manufacturers of eyeglass frames and every manufacturer produces eyeglass frames that are different from one another to optimize aesthetics and functionality for a variety of target customers. In addition, eyeglass-frame temples come in numerous shapes, sizes, and thicknesses, which can also vary widely along the length of their temples.

In order to accommodate a wide range of temple designs, therefore, liner 404 includes slot 416, which is configured to locate an eyeglass-frame temple in mount 102. Slot 416 is connected to a narrow slit that extends to the edge of liner 404 to enable the liner to be opened as widely as necessary to accommodate a wide range of temple thicknesses. This also enables mount 102 to be secured to a temple virtually anywhere along its length without regard to the specific design of the temple.

It should be noted that the strength of the attachment between mount 102 and a temple is proportional the contact area between them—the greater this contact area, the sturdier the connection. As a result, liner 404 preferably surrounds the temple to which it is attached completely to substantially maximize the contact area between them.

Joint 406 is a rotary joint that enables rotation of hasp 414 relative to frame 412. Joint 406 further includes locking screw 418, which can be tightened to lock joint 406 in a fixed position.

Clasp 408 includes seat 420 and catch 422, which collectively define a first fastener that includes the end portions of frame 412 and hasp 414, respectively. Clasp 408 is configured to latch the seat and hasp together once hasp 414 has been rotated into its closed position.

Although seat 420 and catch 422 are preferably secured by a clasp analogous to clasp 408, in some embodiments, a different attachment is used to connect seat 420 and catch 422. Alternative attachment approaches in accordance with the present disclosure include, without limitation, clamps (e.g., C clamps, screw clamps, vice clamps, spring clamps, bar clamps, hose clamps, tubing clamps, screw compressor clamps, power clamps, quick action/grip clamps, etc.), clasps (e.g., deployment clasp, deployment clasp with safety, hidden clasp, push button clasp, push-button fold-over clasp with safety, jewelry clasp, deployment buckle clasp, buckle clasp, etc.), magnets, and Velcro.

Shell 402 is configured such that its height is greater than its width (i.e., sides L1 and L2 are longer than sides S1 and S2). As a result, each of sides L1 and L2 can be bent by a sufficient laterally directed force (i.e., a relatively large force directed along the x-direction), while sides S1 and S2 resist deformation when subjected to a vertically directed force (i.e., a force directed along the y-direction).

When clasp 408 is closed, the elements of mount 102 support one another such that they are collectively rigid and resistant to deformation due to forces subjected on it during normal operation. However, in some embodiments, the flexibility of sides L1 and L2, in conjunction with the flexibility of material M2, enables clasp 408 to be opened by squeezing shell 402 from the sides.

It is an aspect of embodiments in accordance with the present disclosure that the extension of shell 402 over the top of an eyeglass-frame temple to which mount 102 is secured yields a highly secure connection that enables more weight to be added to the temple than possible with prior-art mounts. Furthermore, the combination of a shell that extends over the top portion of an eyeglass-frame temple and a resilient inner liner that can conform to the shape of virtually any temple design, while also imparting a compressive force on the temple, affords a highly secure attachment of the mount to the temple while simultaneously mitigating any motion of the mount relative to the temple during use. Preferably, shell 402 extends completely around the temple such that closure of hasp 414 against frame 412 creates a compressive force that further reduces the compliance of liner 404. Still further, mount 102 is configured such that the closure of clasp 408 compresses liner 404 against the temple such that the liner imparts a compressive force on the temple. Ideally, the compressive force is imparted substantially uniformly around the perimeter of the temple so that motion of the temple in any direction, relative to the temple, is inhibited.

In typical operation, once seat 420 and catch 422 are latched and clasp 408 is closed, locking screw 418 is tightened to lock hasp 414 in its closed position. As a result, locking screw 418 defines a second fastener that operates in conjunction with the first fastener described above (i.e., seat 420 and catch 422) to ensure hasp 414 is not inadvertently opened during the use of mount 102 (e.g., by accidental contact between catch 414 and another element, etc.). In such embodiments, the first and second fasteners collectively define a double-locking mechanism for ensuring shell 402 remains securely closed during use.

It is another aspect of embodiments in accordance with the present disclosure that the shape of shell 402 affords a measure of safety by mitigating the probability of its accidental detachment. Specifically, shell 402 has a rectangular-shaped frame having two long sides—sides L1 and L2. Seat 420 and catch 422 are located on the outside of side L1 and, therefore, extend outward from the outer perimeter of a long side of shell 402. As a result, clasp 408 can only be opened when sides L1 and L2 are squeezed toward one another. This configuration functions as a safety mechanism that safeguards against inadvertent disengagement of the clasp.

In some embodiments, an additional level of safety is included via the addition of a push-button release mechanism or a fold-over closure that operations in conjunction with clasp 408.

FIGS. 5A-B depict schematic drawings of an alternative mount in accordance with the present disclosure. Mount 500 is analogous to mount 102; however, mount 500 includes a double-locking closure mechanism for mitigating accidental detachment of the mount from an eyeglass-frame temple.

As in mount 102, clasp 408 functions as a first fastener for locking frame 412 and hasp 414 in a closed configuration.

In mount 500, fastener 502 functions as a second fastener that must first be disengaged before clasp 408 can be opened (i.e., a safety catch). Fastener 502 includes anchor 504, ramp 506, and retainer 508.

Each of anchor 504 and ramp 506 is a mounting surface rigidly secured to frame 412 and hasp 414, respectively. Ramp 506 additionally includes a curved outer surface and angled inner surface that meet at tip 510.

Retainer 508 is a flexible clip having free end 512. Retainer 508 is configured to rotate about anchor 504.

As will be appreciated by one skilled in the art, when retainer 508 is rotated into its closed position, it stretches slightly to enable end 512 to slide over tip 510, after which the retainer springs back to its normal length and end 512 is captured beneath the angled inner surface of the ramp.

To disengage retainer 508 from ramp 506 and open fastener 502, end 512 is pulled slightly outward (i.e., away from anchor 504) past tip 510, thereby enabling rotation of the retainer out of engagement with ramp 506.

It should be noted that fastener 502 is merely one example of a safety catch suitable for use in embodiments in accordance with the present disclosure. For example, myriad safety catches used for securing jewelry, watches, etc., on a wearer, could be used in mount 500 without departing from the scope of the present disclosure.

Returning now to FIGS. 4A-B, support 410 is an optional mounting element that extends from frame 412. Support 410 includes hole 424, which is configured to receive an extension shaft, as discussed below. Support 410 also includes set screw 422 for locking the extension shaft in hole 424 after its insertion.

In some embodiments, an approach other than a shaft inserted into a hole and affixed with a set screw is used for attaching an accessory to mount 102. Alternative approaches in accordance with the present disclosure include, without limitation, ball-socket joints, twist-lock connections, push-button lock/release mechanisms, snap-on button connections, clamps, quick couplings, twist-lock rings, pin locking, cam locking, push connections, A-Type cable-end input locks, XLR connections, phone connectors, cable connectors, and the like.

Figure 6B:
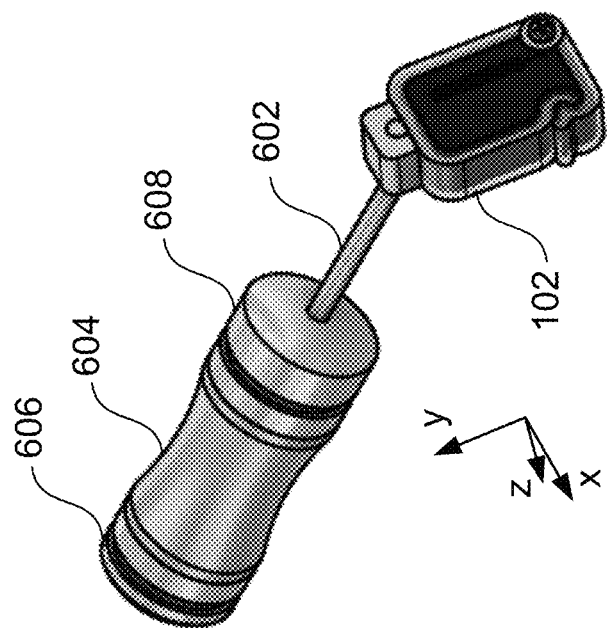
FIGS. 6A-B depict schematic drawings of perspective views of a mount in accordance with the present disclosure with an optional counter weight attached.
Figure 6A:
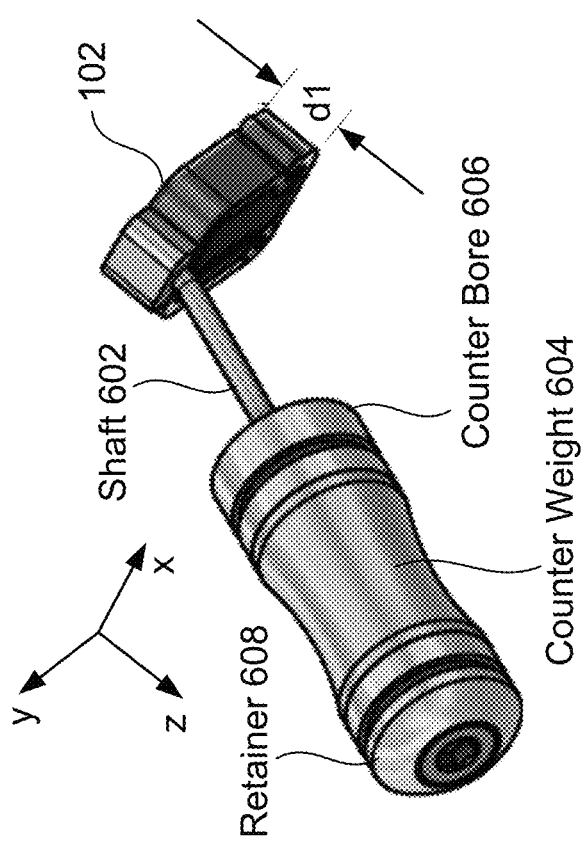

FIGS. 6A-B depict schematic drawings of perspective views of a mount in accordance with the present disclosure with an optional counter-weight accessory attached.

Shaft 602 is a rigid extension that is held in hole 424 by set screw 426 (not shown). In the depicted example, shaft 602 is bent at a 30° angle such that it projects from mount 102 in the y-z plane at an angle of approximately 30° relative to the x-z plane. In some embodiments, shaft 602 is not bent. In some embodiments, shaft 602 is bent at an angle other than 30°.

Counterweight 604 is an accessory comprising a cylindrical weight that includes a central hole through which shaft 602 extends. In the depicted example, counterweight 604 weighs approximately 3.8 ounces; however, any suitable weight without departing from the scope of the present disclosure. In the depicted example, counterweight 604 comprises tungsten; however, in some embodiments, counterweight 604 is made of a different high-density material, such as lead, titanium-tungsten, a ceramic, and the like.

Counterweight 604 is held in position on shaft 602 between counter bore 606 and retainer 608, each of which includes an O-ring that gives rise to a friction force that resists their motion along shaft 602. In the depicted example, the O-ring comprises rubber; however, other materials, such as, Viton, Nitrile, ethylene-propylene, silicone Neoprene, a different elastomer, etc., can be used for the O-ring without departing from the scope of the present invention.

Although the depicted example, includes a counterweight that is removably attachable to mount 102 via a support and shaft, in some embodiments, a mount is, itself, configured as a counterweight. In some such embodiments, the mount comprises materials that afford it a weight suitable for providing eyeglasses a desired weight distribution about the point at which their temples rest on a user's ear. Materials suitable for use in an integrated counter-weight mount include, without limitation, high-density materials such as metals (e.g., steel, lead, chrome, copper, titanium-tungsten, etc.), ceramics, and the like.

In some applications, counterweight 604 is attached to mount 102 to offset the weight of a different accessory (e.g., a talk light, laser, magnifier, etc.), which is attached to the mount via a second shaft 602. In some embodiments, counterweight 604 is attached to a second mount 102, which is secured to one temple of an eyeglass frame, while an accessory is attached to a first mount 102 that is secured to the other temple of the eyeglass frame.

In some embodiments, material M1 is selected as a high-density material (e.g., brass, steel, tungsten, lead, ceramic, etc.) such that shell 402 functions as counterweight 604. In such embodiments, mount 400 can control the balance point of eyeglasses to mitigate negative effects of their weight and imbalance without the addition of counterweight 604; therefore, the inclusion of counterweight 604 (and/or shaft 602) is optional.

While mounts in accordance with the present disclosure are particularly well suited for use in improving the balance of eyewear on a user's head, there are many situations in which it desirable to mount a device (i.e., accessory) other than a simple counterweight so that it can be worn on the head of a user. Examples of such devices include illuminators, sensors, magnifiers, and the like, which leave the user's hands free to perform other tasks. Other such devices include portable entertainment devices, personal communications devices, etc., which can operate either as stand-alone devices or in conjunction with other devices, such as cellular telephones, landline telephones, radios, electronic music systems, video systems, hand-held computers and laptop computers.

Eyeglasses can be a convenient platform for the mounting of such devices; however, as discussed above, prior-art mounts are often ill-suited for the attachment of many such accessories.

Mounts in accordance with the present disclosure, however, enable attachment of a wide range of accessories by replacing counterweight 604 with the accessory. In some embodiments, one or more accessories and/or one or more counterweights are secured to eyewear via one or more mounts in accordance with the present disclosure.

It is to be understood that the disclosure teaches just one example of the illustrative embodiment and that many variations of the invention can easily be devised by those skilled in the art after reading this disclosure and that the scope of the present invention is to be determined by the following claims.

What is claimed is:

1. A mount system configured to removably attach to eyeglasses that includes a pair of temples, each temple of the pair thereof having a fulcrum located between an anterior portion and a posterior portion, wherein the system comprises:
   a first mount configured to removably attach at any point on the posterior portion of one temple of the pair of temples at a time, the first mount comprising:
   (i) a first shell comprising a first material that is substantially rigid, the first shell defining a first interior region, the first shell including a first hole; and
   (ii) a first liner comprising a second material that is resilient, wherein the first liner is located within the first interior region;
   wherein the first mount has (1) a first open state in which the posterior portion of the one temple can be inserted into the first interior region and (2) a first closed state in which the first shell surrounds the first interior region;
   wherein the first shell and the first liner exert a compressive force on the posterior portion of the one temple when the first mount is in its first closed state, and wherein the compressive force attaches the first mount to the one temple and inhibits relative motion between the first mount and the one temple; and
   an accessory that is removably attachable to the first mount, the accessory comprising a first weight and a first shaft having a first end and a second end, the first weight being mounted on the first end, and the second end being configured to secure in the first hole and project angularly from the first mount when the accessory is attached to the first mount;
   wherein, when the first mount is not attached to the posterior portion of the one temple, the eyeglasses are characterized by a first moment-of-inertia (MOI) about the fulcrum of the one temple; and
   wherein, when the first mount is attached to the posterior portion of the one temple, the first mount has a second MOI about the fulcrum of the one temple, the second MOI opposing the first MOI.

2. The system of claim 1 wherein the first shell includes:
a frame that includes a seat; and
a hasp that is attached to the frame at a first joint, wherein the hasp includes a catch that is located distal to the first joint, and wherein the hasp is rotatable about the first joint;
wherein the seat and the catch collectively define a clasp that defines a first fastener operative for latching to hold the first mount in its first closed state.

3. The system of claim 2 wherein the first mount further includes (iii) a second fastener that comprises a locking screw that is located at the first joint, and wherein the locking screw is operative for fixing the frame and the hasp in a first relationship.

4. The system of claim 2 wherein the first mount includes (iii) a second fastener that is operative for latching to hold the first mount in its first closed state, and wherein the first open state of the first mount is enabled only when both of the first and second fasteners are unlatched.

5. The system of claim 1 wherein the first liner includes a slot for locating the posterior portion of the one temple.

6. The system of claim 1 wherein the first shell surrounds the posterior portion of the one temple when it is located in the slot and the first mount is in its first closed state.

7. The system of claim 1 wherein the first mount is configured such that, when the first mount is attached at a first point on the posterior portion of the one temple, the first and second MOI are equal and opposite.

8. The system of claim 1 further comprising a first weight that is removably attachable to the first mount and increases the second MOI.

9. The system of claim 1 further comprising:
a second mount configured to removably attach at any point on the posterior portion of the other temple of the pair of temples, the second mount including:
(i) a second shell comprising a third material that is substantially rigid, the second shell defining a second interior region; and
(ii) a second liner comprising a fourth material that is resilient, wherein the second liner is located within the second interior region;
wherein the second mount has (1) a second open state in which the posterior portion of the other temple can be inserted into the second interior region and (2) a second closed state in which the second shell surrounds the second interior region; and
wherein the second shell and the second liner exert a compressive force on the posterior portion of the other temple when the second mount is in its second closed state, and wherein the compressive force attaches the second mount to the other temple and inhibits relative motion between the second mount and the other temple; and
wherein, when the second mount is not attached to the posterior portion of the other temple, the eyeglasses are characterized by a third MOI about the fulcrum of the other temple; and
wherein, when the second mount is attached to the posterior portion of the other temple, the second mount has a fourth MOI about the fulcrum of the other temple, the fourth MOI opposing the third MOI.

10. The system of claim 9 wherein the first and third materials are the same material and the second and fourth materials are the same material.

11. A mount system configured to removably attach to eyeglasses that includes a pair of temples, each temple of the pair thereof having a fulcrum located between an anterior portion and a posterior portion, wherein the mount system comprises:
a first mount configured to attach at any point on the posterior portion of one temple of the pair of temples at a time, the first mount comprising:
(i) a frame having a u-shape, the frame comprising a first material that is rigid, and the frame having a first end that includes a seat and a second end that includes a rotary joint;
(ii) a hasp comprising a second material that is rigid, the hasp being attached with the frame at the rotary joint such that the hasp is rotatable about the second end, wherein the hasp includes a catch that is distal to the second end, and wherein the frame and the hasp collectively define a shell that has an interior region;
(iii) a liner that comprises a third material that is resilient, the liner being located within the interior region;
(iv) a clasp that includes the seat and the catch, wherein the clasp defines a first fastener operative for latching to hold the shell in its closed state, and wherein the shell surrounds the interior region when the clasp is latched; and
(v) a second fastener that is operative for holding the shell in its closed state;
wherein the shell induces a compressive stress on the posterior portion of the one temple via the liner when the shell is in the closed state, and wherein the compressive stress attaches the first mount to the one temple and inhibits relative motion between the mount and the one temple;
wherein, when the first mount is not attached to the posterior portion of the one temple, the eyeglasses are characterized by a first moment-of-inertia (MOI) about the fulcrum of the one temple; and
wherein, when the first mount is attached to the posterior portion of the one temple, the first mount has a second MOI about the fulcrum of the one temple, the second MOI opposing the first MOI.

12. The system of claim 11 wherein the frame includes a first side and a second side that opposes the first side, and wherein the clasp is configured such that an inward lateral force directed on the first and second sides disengages the seat and the catch.

13. The system of claim 11 wherein the second fastener includes a retainer and a ramp, and wherein the second fastener is engaged when the retainer is captured in the ramp and disengaged when the retainer is not captured in the ramp.

14. The system of claim 13 wherein the shell surrounds the posterior portion of the one temple when the posterior portion of the one temple is located in the slot and the shell is in its closed state.

15. The system of claim 11 wherein the liner completely fills the interior region.

16. The system of claim 11 wherein the first material and the second material are the same material.

17. The system of claim 11 wherein each of the first and second material is selected from the group consisting of cellulose acetate butyrate a metal, a plastic, wood, ceramic, and a composite material.

18. The system of claim 11 wherein the third material is selected from the group consisting of silica gel, rubber, foam, silicone, fabric, and Styrofoam.

19. The system of claim 11 wherein the second fastener includes a locking screw that is located at the rotary joint, the locking screw being operative for fixing the rotation of the hasp about the second end.

20. The system of claim 11 wherein the mount further comprises:
- a support that includes a hole;
- a shaft that is located in the hole; and
- a set screw for locking the shaft in the hole.

21. The system of claim 11 further comprising an accessory that is removably attachable to the mount, the accessory being selected from the group consisting of a counterweight, an illuminator, a magnifier, a sensor, and a communications device.

* * * * *